United States Patent Office 2,905,411
Patented Sept. 22, 1959

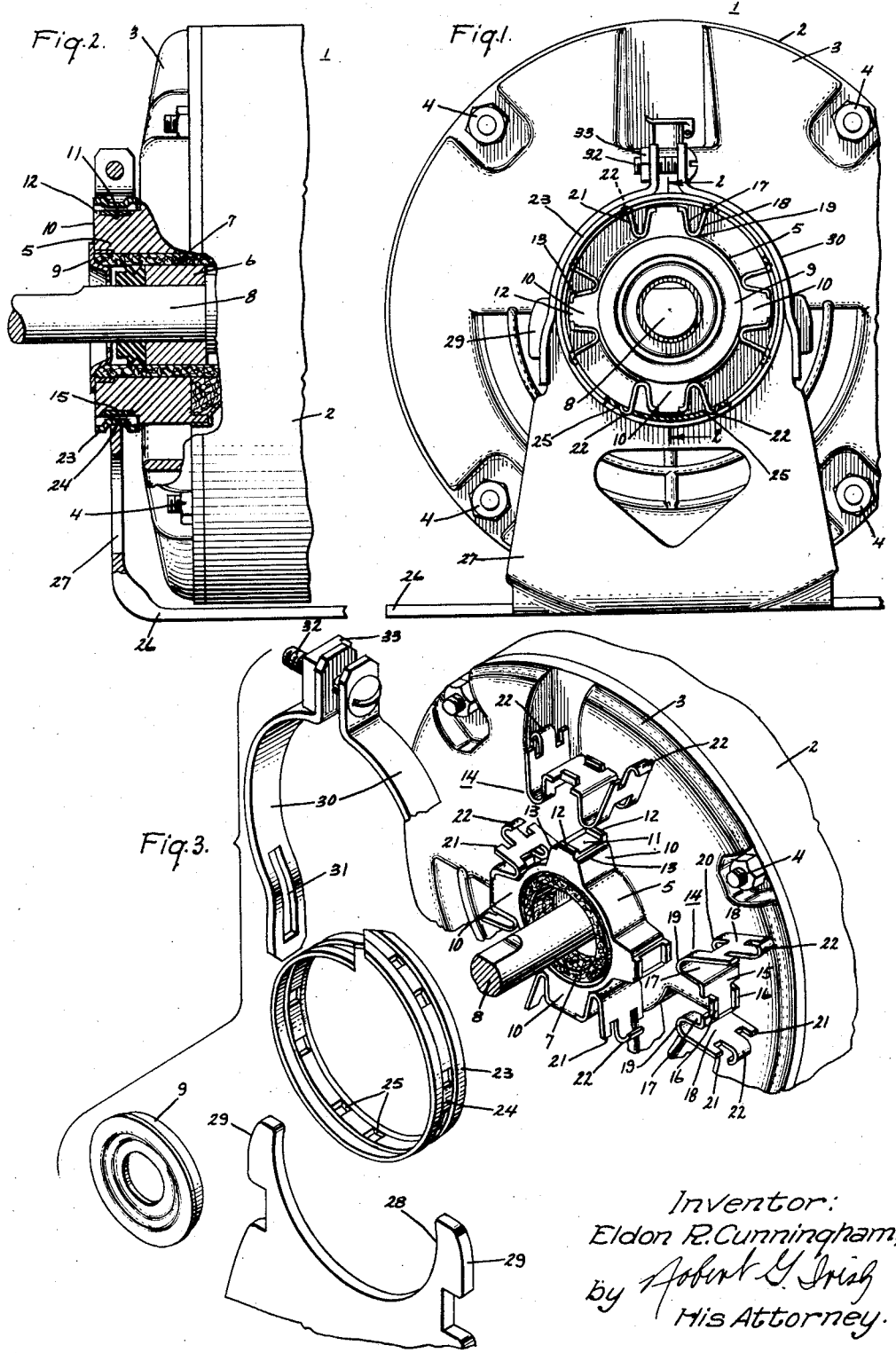

2,905,411

RESILIENT MOUNTING

Eldon R. Cunningham, Fort Wayne, Ind., assignor to General Electric Company, a corporation of New York Application August 21, 1956, Serial No. 605,342

5 Claims. (Cl. 248—26)

This invention relates to machines having rotatable parts, and more particularly to resilient mounting means for such machines.

It is well known that it is most important, in machines having rotatable parts, to provide suitable means for isolating from the machine support the torsional vibrations caused by torque pulsations. These are particularly noticeable on single phase alternating-current motors. Consequently, many different means of achieving this end have been devised; an early and well-known means of effecting the purpose, for instance, was to provide springs between the machine and the support in very much the same manner that an automobile is mounted on its axles on springs. In the case of relatively small machinery, however, this type of arrangement has proved to be relatively expensive. A solution to the problem was set forth in Patent 2,074,136, issued on March 16, 1937, to A. F. Welch, and assigned to the assignee of the present application. This patent proposed the interposition of an annulus of resilient material between each hub of the machine and a support which engaged the hubs. By such a provision, the annulus of resilient material effected the desired purpose of isolating the major part of the vibrations of the machine from the support.

The cost of the Welch arrangement, while providing considerable economy with respect to previous constructions, has still left room for improvement; in particular, the requirement for an annulus of resilient material, preferably bonded to one or more metallic surfaces, has proved to be the expensive part of the construction and thus is the most susceptible to advantageous modification. Further, the fact that Welch uses a resilient material results in a yielding effect in response to axial and radial forces, as well as those in torsion. However, the vibrations of rotating machines generally result from torsional forces; a high degree of stiffness in the radial and axial directions is desirable to provide the necessary rigidity under radial and axial loads.

It is known that suitable configurations of relatively non-resilient material (such as metals) can provide a part which has resilience as a result of the configuration, and that such a part can be made stiff to certain directions of force and yielding to others. In the light of the low cost and better aging characteristics possible with metallic parts, it is most desirable to provide a type of construction similar to that of Welch utilizing exclusively relatively non-resilient materials to provide a resilient mounting arrangement.

It is, therefore, an object of this invention to provide improved resilient mounting means between the hub of a machine and the support therefor wherein the resilience is obtained by the use of parts formed of relatively non-resilient material such as metal.

It is a further object of this invention to provide an improved resilient mounting member which will retain all the desirable features of the construction of the aforesaid Welch patent without the use of resilient material such as rubber.

Yet a further object is to provide a mounting of the Welch type which is resilient only in response to a predetermined direction of force and which has high stiffness to other forces.

In one aspect thereof, the invention provides means for resiliently mounting a machine having a rotatable member and a stationary member with a hub. The means include a relatively rigid annulus, generally of metal, positioned substantially concentric with the hub and outwardly spaced therefrom. A plurality of circumferentially spaced metallic means, each formed to act as a spring, are each positioned between and secured to the hub and the annulus. The spring means are suitably formed and positioned to provide yielding resistance to torsional forces on the hub relative to the annulus so as to isolate torsional vibrations, and to be relatively stiff in response to axial and radial forces.

The features of the invention which are believed to be novel are set forth with particularlity in the appended claims. The invention, itself, however, together with further objects and advantages thereof, may best be understood by reference to the following description taken in connection with the accompanying drawing.

In the drawing, Figure 1 is an end view of a machine having a rotatable part provided with the improved resilient mounting of this invention.

Figure 2 is a side view of the machine including a cross sectional view along line 2—2 in Figure 1; and Figure 3 is an exploded view in perspective of the improved resilient mounting of this invention.

Referring now to the figures of the drawing, there is shown a rotating machine 1 (such as a small electric motor, for instance) having a housing member 2 secured to an end shield member 3 by threaded members 4 so as to form a housing for the machine. The end shield 3 includes a hub member 5; a bearing sleeve 6 is positioned within hub member 5 together with a suitable lubricating arrangement 7 so as to support a shaft 8 in rotatable relation to the housing. As shown, the bearing 6, together with its lubricating arrangement 7, is preferably enclosed by means of a closure member 9 snapped into the end of hub 5.

In order to isolate the torsional vibrations of machine 1 which result both directly and indirectly from the rotation of shaft 8, the improved arrangement described herebelow is provided. Hub 5 is provided with a plurality of equispaced raised portions 10, preferably equispaced, each of which has a relatively flat outer surface 11 bordered at its axial extremities by walls 12 which are preferably substantially transverse to the axis of machine 1, as shown. In its preferred form, each hub portion 10 also includes a guiding ridge 13 on each side of flat portion 11.

Four spring members 14 are respectively arranged in cooperative relation with hub projections 10. Each of the spring members 14 is formed of thin metal, preferably spring steel, and is formed substantially as a leaf spring, as will appear below, so as to be imbued with characteristics of resilience although not being formed from an inherently resilient material such as rubber. Each member 14 includes a relatively flat central portion 15 with a pair of turned up tabs 16 centrally arranged at the axial extremities. As can be seen from an examination of the figures, flat part 15 seats on flat part 11 of hub projection 10 with tabs 16 in engagement with walls 12 so that axial movement of member 14 relative to projection 10 is effectively and positively precluded. Each member 14 further has on each side of part 15 a U-shaped portion including an inner spring leg 17 and an outer spring leg 18 connected by a bight portion 19. As the figures show, when member 14 is in position on hub projection 10, inner legs 17 have their outer surfaces seated against the sides of ridges 13 so that, in effect, any substantial circumferential movement of member 14 relative to hub projection 10 is precluded when the two are arranged in engaging relationship. As shown, legs 17 and 18 and curved portion 19 may include an opening 20; such an opening constitutes an additional control on the degree of resilience of the U-shaped portion besides the obvious one of varying the thickness of the material. The outer end of leg 18 is provided with three tangs, two outer ones 21 and a single center one 22 which extends a slightly greater distance than tangs 21 for a purpose which will be described herebelow.

A relatively rigid annulus 23 is provided with a central circumferentially extending groove 24. Eight openings (one for each tang 22) 25 are formed in groove 24 in four equispaced pairs, the distance between the two openings 25 of any one pair being preferably slightly less than the distance between the two tangs 22 of a member 14 when it is in its unbiased configuration. As shown in Figure 3, member 23 is not necessarily formed to be continuous although this may be done if so desired.

In assembled relation, annulus 23 is positioned concentrically with and outwardly spaced from bulb 5. The difference in the radii of the hub and the annulus 23 is preferably such that there will be a small clearance between the radially outermost point of each hub projection 10 and the inner surface of annulus 23. When each member 14 is seated on a projection 10 of hub 5 in the intended relation, with its width extending in a substantially axial direction (relative to shaft 8) and with spring legs 18 extending in a generally radial direction, and when annulus 23 is arranged concentrically on the hub, the tangs 22 of each member 14 fit into the two openings 25 of each pair in annulus 23 so as to prevent tangential movement between the ends of legs 18 and annulus 23. The tangs 21 abut the inner surface of annulus 23 on each side of tang 22 to complete the engagement. The relative dimensions of the parts are such that, as assembled, member 14 is preloaded radially against annulus 23 and hub portion 10. As shown in Figure 1, the radial portion or leg 18 of each leaf spring member 14 is of greater length than the radial distance between the annulus 23 and the point of engagement of each spring member 14 with the hub 5.

A support 26 of rigid sheet material, usually steel, is provided with an upstanding portion 27 which terminates in a curved recess 28 having a pair of latches 29 defined respectively on the sides thereof. Annulus 23 fits within recess 28 of member 26 so that the support extends into circumferential groove 24. The annulus 23 and the support 26 are secured in their relationship by suitable clamping means, such as, for instance, clamping members 30 having slots 31 which fit over the latches 29. The two clamping members 30 are secured together at their upper ends by means of a threaded member 32 which extends through the two clamping members and is provided with an internally threaded member 33 which can be tightened so as to tighten the engagement of the clamping members when they are positioned on the annulus 23 as best seen in Figure 1. With the above described arrangement, members 14 act to maintain annulus 23 substantially concentric with hub 5 under no load conditions for shaft 8. Where a radial load is encountered, the shape of members 14 permits them to flex slightly in response to a radial force. However, ordinarily, each member 14 will already be preloaded in a radial direction when it is in the assembled position so that a considerable amount of radial force will be necessary to cause further radial deflection. In addition, the arrangement whereby hub projections 10 come almost to the inner surface of annulus 23 greatly limits the possible amount of radial deflection by assuring positive contact between annulus 23 and the hub projection 10 after a very small deflection.

Torsional vibrations are isolated from support 26 by the spring action of members 14 derived from the particular U-shaped configuration of spring arms 17 and 18 and the curved portion 19 joining them. The construction permits arcuate movement of annulus 23 relative to hub 5 by a flexing of spring arms 17 and 18 of each member 14 relative to each other. In this manner, torsional vibrations are substantially isolated from support 26. The optimum degree of vibration absorption of members 13 can be obtained without difficulty by variation of the thickness, width and length of the spring arms 17 and 18 and the curved portion 19 which joins them.

It will readily be observed that, in an axial direction, members 14 will have practically no resilience and that therefore the machine will be relatively inflexible axially, as is desirable to maintain clearance between isolated parts and supports. In addition, the effect of the axial forces acting on each member 14 through hub 5 is kept to a minimum by the arrangement whereby members 14 engage hub projections 10 radially adjacent annulus 23. The axial torque which tends to move member 14 out from within annulus 23 is determined by the axial force multiplied by the radial moment arm from the point where member 14 engages hub projection 10 to the point where it engages annulus 23. The arrangement whereby the securement of member 14 to hub projection 10 is at almost the same radial distance as its securement to annulus 23 makes the axial torque produced exceedingly small and thus ineffective to disturb the resilient mounting assembly.

It will be seen from the foregoing that the invention provides an arrangement whereby a resilient mounting arrangement is provided so as to give a high degree of both radial stiffness and axial stiffness relative to torsional stiffness. Both of these are desirable factors, inasmuch as the need is to eliminate the torsional vibrations set up by the rotation without allowing an undue amount of freedom of movement of the machine relative to its base in response to radial and axial forces. It will further be seen that this effect is achieved by the use of inherently non-resilient material fashioned into a configuration to give resilience in the direction desired and to preclude resilience where it is not desired, and that such efficiently and economically in comparison to previous constructions.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. In a machine having a rotatable member and a stationary member provided with a hub; means for resiliently mounting said machine comprising a relatively rigid annulus spacedly positioned about said hub and substantially concentric therewith, and a plurality of circumferentially spaced leaf spring members each secured to said annulus and engaging said hub, each said leaf spring member having a substantial portion of its length extending in a generally radial direction between said annulus and said hub, said radial portion of each leaf spring member being of greater length than the radial distance between the annulus and the point of engagement of said leaf spring member with the hub, and with its width extending in a substantially axial direction, said spring members constituting the sole spacing and motion limiting factor between said hub and said annulus.

2. In a machine having a rotatable member and a stationary member provided with a hub; means for resiliently mounting said machine comprising a relatively rigid annulus spacedly positioned about said hub and substantially concentric therewith, said hub having a plurality of circumferentially spaced radial projections, and a plurality of leaf spring members each including a substantially U-shaped portion secured at one end to said annulus and at the other end to one of said hub projections, each said U-shaped portion having the leg secured to said annulus extending in a generally radial direction between said hub and said annulus for a greater distance than the radial distance between said annulus and the outermost portions of said radial projections and having its width extending in a substantially axial direction, said spring members constituting the sole spacing and motion limiting factor between said hub and said annulus.

3. In a machine having a rotatable member and a stationary member provided with a hub; means for resiliently mounting said machine comprising a relatively rigid annulus spacedly positioned about said hub and substantially concentric therewith, said hub having a plurality of circumferentially spaced radial projections having their outermost portions adjacent the inner surface of said annulus, and a plurality of leaf spring members each including a central portion in rigid engagement with one of said hub projections, each leaf spring member further having a U-shaped portion formed at each end of said central portion with its free end engaging said annulus, each said U-shaped portion having its leg which is secured to said annulus extending in a generally radial direction for a greater distance than the radial distance between the inner surface of said annulus and outermost portions of the radial projections and having its width extending in a substantially axial direction, said spring members constituting the sole spacing and motion limiting factor between said hub and said annulus.

4. In a machine having a rotatable member and a stationary member provided with a hub; means for resiliently mounting said machine comprising a relatively rigid annulus positioned about said hub and substantially concentric therewith, said annulus having a plurality of circumferentially spaced openings formed therein, said hub having a plurality of circumferentially spaced radial projections each having a substantially flat outer surface adjacent the inner surface of said annulus, each said flat outer surface portion including a raised wall substantially transverse to the axis of the machine, and a plurality of leaf spring members each including a central portion seated on said hub flat outer portion with an upwardly turned tab in engagement with said raised wall, each leaf spring member further having U-shaped portions formed at each end of said central portion, the inner leg of each U-shaped portion having its outer side engaging the side of said hub projection, the free end of the outer leg of each U-shaped member being arranged within one of said annulus openings, said openings being of such a circumferential spacing that said leaf spring members must be flexed in order to assemble said free ends within the openings so that said U-shaped portions are preloaded when so assembled, said U-shaped portions having their outer legs extending in generally radial directions and having their width extending in a substantially axial direction.

5. In a machine having a rotatable member and a stationary member provided with a hub; means for resiliently mounting said machine comprising a plurality of relatively rigid supporting surfaces circumferentially spaced about said hub on a circle substantially concentric with said hub, and a plurality of circumferentially spaced leaf spring members secured to said supporting surfaces and engaging said hub and constituting the sole spacing and motion limiting factor between said hub and said supporting surfaces, each of said leaf spring members having a substantial portion of its length extending in a generally radial direction between a said supporting surface and said hub, said radial portion being of greater length than the radial distance between the said supporting surface and the point of engagement of said leaf spring member with the hub.

References Cited in the file of this patent

UNITED STATES PATENTS

| | | |
|---|---|---|
| 1,866,154 | Ell | July 5, 1932 |
| 1,869,100 | Gralenski | July 26, 1932 |
| 2,056,676 | Kennedy | Oct. 6, 1936 |
| 2,115,569 | Brown | Apr. 26, 1938 |